United States Patent
Safai et al.

(10) Patent No.: US 10,648,931 B2
(45) Date of Patent: May 12, 2020

(54) X-RAY INSPECTION SYSTEM AND METHOD FOR PIPES

(71) Applicant: The Boeing Company, Chicago, IL (US)

(72) Inventors: Morteza Safai, Newcastle, WA (US); Gary Ernest Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 15/940,558

(22) Filed: Mar. 29, 2018

(65) Prior Publication Data
US 2019/0302038 A1 Oct. 3, 2019

(51) Int. Cl.
*G01N 23/203* (2006.01)
*G01N 23/20008* (2018.01)

(52) U.S. Cl.
CPC ..... *G01N 23/20008* (2013.01); *G01N 23/203* (2013.01); *G01N 2223/3303* (2013.01); *G01N 2223/3304* (2013.01); *G01N 2223/628* (2013.01); *G01N 2223/631* (2013.01); *G01N 2223/646* (2013.01); *G01N 2291/2634* (2013.01)

(58) Field of Classification Search
CPC ............... G01N 21/952; G01N 21/954; G01N 2223/628; G01N 23/20083; G01N 23/203; G01N 2223/646; G01N 2291/2634; G01N 2223/3303; G01N 2223/3304; G01N 2223/631; G01N 23/20008
See application file for complete search history.

(56) References Cited

U.S. PATENT DOCUMENTS

| 8,759,780 B2 * | 6/2014 | Dobbs ..................... G01B 15/02 250/360.1 |
| 9,151,721 B2 | 10/2015 | Safai |
| 2011/0168900 A1 | 7/2011 | Dobbs |
| 2012/0148026 A1 | 6/2012 | Safai |
| 2013/0195248 A1 | 8/2013 | Rothschild et al. |

OTHER PUBLICATIONS

Safai et al., "X-Ray Inspection System for Pipes," U.S. Appl. No. 15/701,244, filed Sep. 11, 2017, 44 pages.
Georgeson et al., "High Speed Pipe Inspection System," U.S. Appl. No. 15/701,301, filed Sep. 11, 2017, 56 pages.
Safai et al., "Backscatter X-Ray Inspection System for Pipes," U.S. Appl. No. 15/940,622, filed Mar. 29, 2018, 49 pages.
European Patent Office Extended Search Report, dated Sep. 19, 2019, regarding Application No. 19162271.1, 9 pages.

* cited by examiner

*Primary Examiner* — David P Porta
*Assistant Examiner* — Fani Boosalis
(74) *Attorney, Agent, or Firm* — Yee & Associates, P.C.

(57) ABSTRACT

A method, a system, and an apparatus for scanning an elongate structure. A scanner in a scanning system is moved on a helical path around the elongate structure. The scanner is moved on the helical path around the elongate structure using a helical track system attached to the elongate structure using a translating structure. An x-ray beam is emitted from the scanner while the scanner moves on the helical path. Backscatter is detected from the x-ray beam encountering the elongate structure.

21 Claims, 14 Drawing Sheets

X-RAY INSPECTION SYSTEM AND METHOD FOR PIPES

CROSS-REFERENCE TO RELATED APPLICATION

This application is related to U.S. Ser. No. 15/940,622, entitled "Backscatter X-Ray Inspection System for Pipes", filed even date hereof, which is incorporated herein by reference in its entirety.

BACKGROUND INFORMATION

1. Field

The present disclosure relates generally to inspection systems and, in particular, to nondestructive inspection of elongate structures. Still more particularly, the present disclosure relates to a method, an apparatus, and a system for nondestructive inspection of pipes using x-ray scanners.

2. Background

Pipes are used in many industries to transport fluids. For example, the petroleum industry uses pipes to transport oil and gas. Pipes for transporting oil are made from steel or plastic and are usually buried. The oil is moved through the pipes by pump stations along a pipeline.

Natural gas and similar gas fuels are pressurized into liquid form. Natural gas pipes are often constructed of carbon steel. As another example, district heating or teleheating systems use a network of insulated pipes which transport heated water, pressurized hot water, or sometimes steam, to a customer.

Water supply systems also employ pipes to transport drinking water to customers. Pumps pressurize potable water that flows through pipes to deliver water for consumption.

Pipe inspections are performed to determine the condition of the pipes. For example, an inspection may be made to determine whether obstructions, corrosion, or other inconsistencies are present in the pipes. Inspections also may be performed to determine wall thickness, weld quality, as well as other parameters. The pipe inspections involve nondestructive testing and may be performed in a number of different ways. For example, pipe inspections may be made using video. This type of inspection, however, involves introducing a device into the pipes. Another type of inspection uses x-rays. This type of testing allows for the inspection to be made from the exterior of the pipe.

One manner in which current x-ray inspections are performed is by hand. A human operator moves an x-ray scanning system along the pipe to perform the inspection. With insulated pipes, x-rays are directed through the pipe from a source on one side of the pipe and detected by a detector on the opposite side of the pipe to generate an image. In many cases, the source is then moved to the other side of the pipe and another image is generated.

A pipe for transporting oil may extend for hundreds of miles. Inspecting hundreds of miles of pipe is a time-consuming and tedious process using current techniques.

Therefore, it would be desirable to have a method and apparatus that take into account at least some of the issues discussed above, as well as other possible issues. For example, it would be desirable to have a method, an apparatus, and a system that overcome a technical problem with inspecting pipes with a desired level of efficiency.

SUMMARY

An embodiment of the present disclosure provides for a scanning system. The scanning system comprises a helical track system, a translating structure, and a scanner. The helical track system is configured to be placed around an elongate structure. The translating structure is configured to move on the helical track system on a helical path. The scanner is connected to the translating structure, wherein the scanner is configured to emit an x-ray beam.

Another embodiment of the present disclosure provides for a pipe scanning system. The pipe scanning system comprises a helical track system, a translating structure, a scanner, and a controller. The helical track system is configured to be placed around a pipe. The translating structure is configured to move on the helical track system on a helical path on the pipe. The scanner is connected to the translating structure. The controller is in communication with the translating structure and the scanner. The controller is configured to control the translating structure to move on the helical track system on the helical path and control the scanner to emit an x-ray beam while the translating structure moves on the helical track system on the pipe. The controller is also configured to detect backscatter from the x-ray beam encountering the pipe.

Yet another embodiment of the present disclosure provides a method for scanning an elongate structure. A scanner in a scanning system is moved on a helical path around the elongate structure. The scanner is moved on the helical path around the elongate structure using a helical track system attached to the elongate structure using a translating structure. An x-ray beam is emitted from the scanner while the scanner moves on the helical path. Backscatter is detected from the x-ray beam encountering the elongate structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to have a method, an apparatus, and a system that automatically scans an elongate structure, such as a pipe.

The illustrative embodiments recognize and take into account that a rail or track system may be attached to a pipe on which an x-ray scanner may be moved. The illustrative embodiments recognize and take into account that this type of scanning typically only provides for scanning in an axial direction, a direction along an axis extending centrally through the pipe. The illustrative embodiments recognize and take into account that this type of scanning system takes more time than desired to attach a track to one side of a pipe, remove that track and reattach the track to another side of pipe to scan the pipe.

Thus, the illustrative embodiments provide a method, an apparatus, and a system for scanning elongate structures. In one illustrative example, a scanning system comprises a helical track system, a translating structure, and the scanner. The helical track system is configured to be placed around an elongate structure. The elongate structure may be, for example, a pipe. The translating structure is configured to move on the helical track system on a helical path. The scanner is connected to the translating structure, wherein the scanner is configured to emit an x-ray beam.

Figure 1:
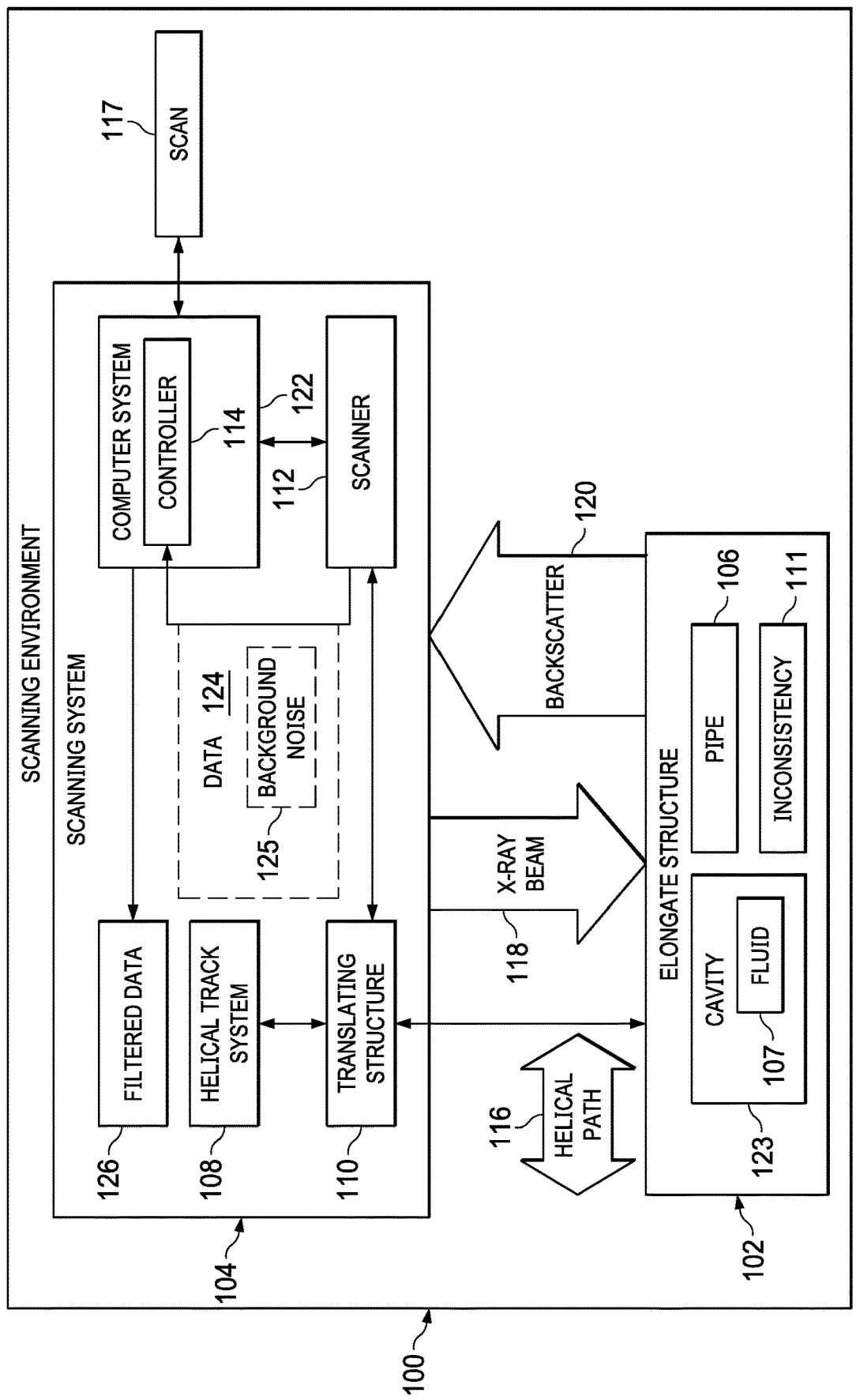
FIG. 1 is an illustration of a block diagram of a scanning environment in accordance with an illustrative embodiment.

With reference now to the Figures and, in particular, with reference to FIG. 1, an illustration of a block diagram of a scanning environment is depicted in accordance with an illustrative embodiment. As depicted, scanning environment 100 is an environment in which elongate structure 102 can be inspected using scanning system 104. In this illustrative example, elongate structure 102 takes the form of pipe 106. Pipe 106 can be an insulated pipe, an uninsulated pipe, a steel pipe, an oil pipe, a natural gas pipe, or some other type of pipe.

In this example, pipe 106 may carry various types of materials. For example, pipe 106 carries fluid 107. Fluid 107 can take a number of different forms. For example, fluid 107 can be selected from at least one of a liquid, a gas, crude petroleum, refined petroleum, hydrogen, a fuel, an aircraft fuel, oil, water, wine, beer, a natural gas, a biofuel, or other types of materials.

In this illustrative example, scanning system 104 is used to determine whether inconsistency 111 is present within pipe 106. As depicted, inconsistency 111 is indicated by an unexpected result from scanning of elongate structure 102. For example, the unexpected result may be a value that is greater or less than a threshold. The unexpected result may be a value that is outside of a desired range.

Inconsistency 111 may take a number of different forms. For example, inconsistency 111 may be selected from a group comprising corrosion, internal corrosion, external corrosion, flow-induced corrosion, pitting, thinning walls, an out-of-tolerance welding, an out-of-tolerance deposit, scale, a crack, damaged insulation, and other undesired results.

As used herein, "a number of," when used with reference to items, means one or more items. For example, "a number of different forms" is one or more different forms.

In this illustrative example, scanning system 104 includes a number of different components. As depicted, scanning system 104 comprises helical track system 108, translating structure 110, scanner 112, and controller 114.

In this illustrative example, helical track system 108 is configured to be placed around elongate structure 102. In other words, helical track system 108 can wrap around elongate structure 102 to define helical path 116. Helical track system 108 can be connected to elongate structure 102 using at least one of a vacuum system, a biasing system, a magnetic foot system, or some other suitable mechanism.

Translating structure 110 can be connected to helical track system 108. As depicted, translating structure 110 is configured to move on helical track system 108 on helical path 116.

In the illustrative example, scanner 112 is associated with translating structure 110. When one component is "associated" with another component, the association is a physical association. For example, a first component, scanner 112, may be considered to be physically associated with a second component, translating structure 110, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, an extension of the second component, or both.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Scanner 112 is configured to emit x-ray beam 118. In this illustrative example, x-ray beam 118 is comprised of x-ray radiation, which is a form of electromagnetic radiation. X-ray beam 118 has wavelengths from about 0.01 nanometers to about 10 nanometers, which correspond to frequencies from about 30 petahertz to about 30 exahertz having energies from about 100 eV to about 450 keV. X-ray beam 118 typically has a wavelength shorter than ultraviolet rays and longer than gamma rays. Further, scanner 112 is configured to detect backscatter 120 occurring as a result of x-ray beam 118 encountering elongate structure 102.

As depicted, scanner 112 can perform scan 117 using a number of different types of x-ray scanning techniques. In the illustrative example, scanner 112 may be selected from at least one of an x-ray scanning system, a backscatter x-ray system, or a through transmission x-ray system.

In this illustrative example, controller 114 is configured to control translating structure 110 to move on helical track system 108 on helical path 116 on elongate structure 102. Further, controller 114 is also configured to control scanner 112 to scan elongate structure 102 while translating structure 110 moves on helical track system 108 on helical path 116 on elongate structure 102.

As depicted, controller 114 can be implemented in software, hardware, firmware, or a combination thereof. When software is used, the operations performed by controller 114 can be implemented in program code configured to run on hardware, such as a processor unit. When firmware is used, the operations performed by controller 114 can be implemented in program code and data and stored in persistent memory to run on a processor unit. When hardware is employed, the hardware may include circuits that operate to perform the operations in controller 114.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, controller 114 can be located in computer system 122 for scanning system 104. Computer system 122 is a physical hardware system that includes one or more data processing systems. When more than one data processing system is present, the data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

In the illustrative example, when operating, controller 114 controls scanner 112 to scan elongate structure 102 having cavity 123 with fluid 107 within cavity 123. In the illustrative example, scanner 112 generates data 124 for scan 117. In one illustrative example, data 124 in scan 117 comprises pixels that indicate intensities of a backscatter of x-ray beam 118 detected by scanner 112.

Controller 114 filters data 124 in scan 117 generated while scanner 112 moves on helical path 116 on elongate structure 102. The filtering of data 124 for scan 117 is performed by controller 114 to remove the portion of data 124 in scan 117 attributable to fluid 107 to form filtered data 126. Controller 114 can also filter data 124 in scan 117 to remove the portion of data 124 attributable to background noise 125 to form filtered data 126. Background noise 125 can be caused by elements, such as, at least one of welding repairs, brackets in the grid, the grid structure, or other elements that can cause backscatter that can mask or act as noise, making detecting an inconsistency harder.

For example, the intensities and data 124 correspond to energy of the backscatter. Controller 114 can filter data 124 to remove the intensities associated with fluid 107. As depicted, controller 114 can filter data 124 using at least one of a high-pass filter, a low-pass filter, a bandpass filter, or some other suitable type of filter. In other words, controller 114 can use any one of these types of filters alone or in combination.

In this illustrative example, scanning system 104 enables detecting inconsistency 111 in pipe 106 more accurately as compared to currently used techniques. For example, scanning system 104 enables detecting of inconsistency 111 in elongate structure 102 in filtered data 126.

In one illustrative example, one or more technical solutions are present that overcome a technical problem with inspecting pipes with a desired level of efficiency. As a result, one or more technical solutions may provide a technical effect for scanning elongate structure 102 along helical path 116 using helical track system 108. With helical track system 108, scanning system 104 is able to more efficiently scan elongate structure 102. In an illustrative example, one or more technical solutions enable inspecting a pipe more quickly and automatically.

In one illustrative example, one or more technical solutions are present that overcome a technical problem with detecting inconsistencies in elongate structures, such as pipes carrying fluids. As a result, one or more technical solutions in the illustrative examples may provide a technical effect of filtering data from a scan of an elongate structure, such as a pipe or fuel tank in an aircraft wing, to remove a portion of the data in the scan that is attributable to the fluid. The filtering increases the ability to detect inconsistencies in elongate structures.

Thus, the illustrative examples provide one or more technical solutions that enable inspecting an elongate structure for inconsistencies without having to remove the fluid from a cavity in the elongate structure. As a result, elongate structures carrying fluids can be more easily and quickly inspected as compared to currently used techniques. For example, a fuel tank in a wing of an aircraft can be scanned without draining fuel from the fuel tank. As another example, a pipe carrying oil can be inspected more easily using scanning system 104 in FIG. 1. Inspecting a pipe extending for hundreds of miles can be performed more easily without having to drain the oil from the pipeline.

Thus, an elongate structure can be scanned with a translating structure moving a scanner on a helical path around the elongate structure. Further, the data generated from scanning the elongate structure can be filtered to remove portions of the data attributable to a fluid within the elongate structure or background noise. In this manner, scanning of an elongate structure can be performed quickly and automatically with increased accuracy in the illustrative examples.

As a result, computer system 122 operates as a special-purpose computer system in which controller 114 in computer system 122 enables an ability to more efficiently detect inconsistencies in elongate structure 102. In particular, controller 114 transforms computer system 122 into a special-purpose computer system as compared to currently available general computer systems that do not have controller 114.

Figure 2:
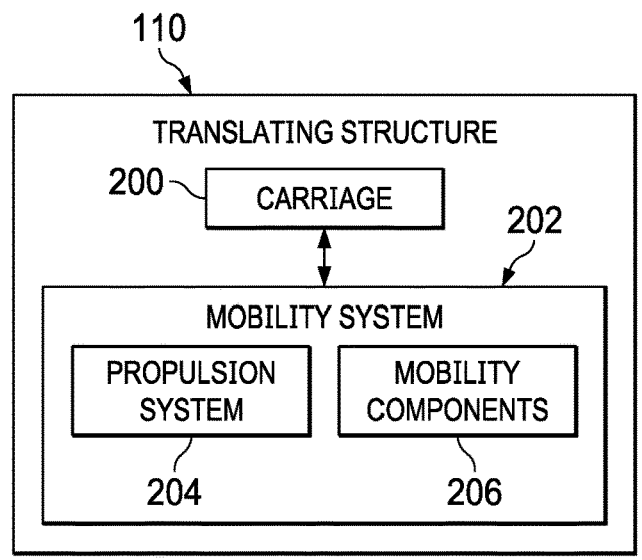
FIG. 2 an illustration of a block diagram of a translating structure in accordance with an illustrative embodiment.

Turning next to FIG. 2, an illustration of a block diagram of a translating structure is depicted in accordance with an illustrative embodiment. In the illustrative examples, the same reference numeral may be used in more than one figure. This reuse of a reference numeral in different figures represents the same element in the different figures.

In this depicted example, translating structure 110 includes a number of different components. As depicted, translating structure 110 comprises carriage 200 and mobility system 202.

In this example, carriage 200 is a physical structure that is configured to attach itself to at least one of helical track system 108 or elongate structure 102 shown in block form in FIG. 1. For example, carriage 200 holds scanning system 104, shown in block form in FIG. 1, and is configured to attach itself to helical track system 108 on elongate structure 102 in FIG. 1. In this illustrative example, mobility system 202 is configured to move carriage 200 such that carriage 200 moves on helical path 116 on elongate structure 102.

As depicted, mobility system 202 comprises propulsion system 204 and mobility components 206. The components are selected to move carriage 200 on helical track system 108.

Propulsion system 204 may be an electrically controlled propulsion system. Propulsion system 204 may be, for example, without limitation, selected from at least one of an internal combustion engine, an electric engine, or some other suitable propulsion system.

Mobility components 206 provide carriage 200 with the capability to move in a number of directions. Mobility components 206 may be comprised of at least one of a roller, a wheel, a holonomic wheel, a track, or other suitable components. As used herein, a holonomic wheel (or an omni wheel) is one that is capable of moving in multiple directions across a surface.

Mobility components 206 also may provide for engaging or attaching carriage 200 to helical track system 108 for elongate structure 102. For example, mobility components 206 may be configured to connect to helical track system 108. In other illustrative examples, mobility system 202 may be configured to attach to elongate structure 102 and use helical track system 108 as a guide to move on helical path 116.

Figure 3:
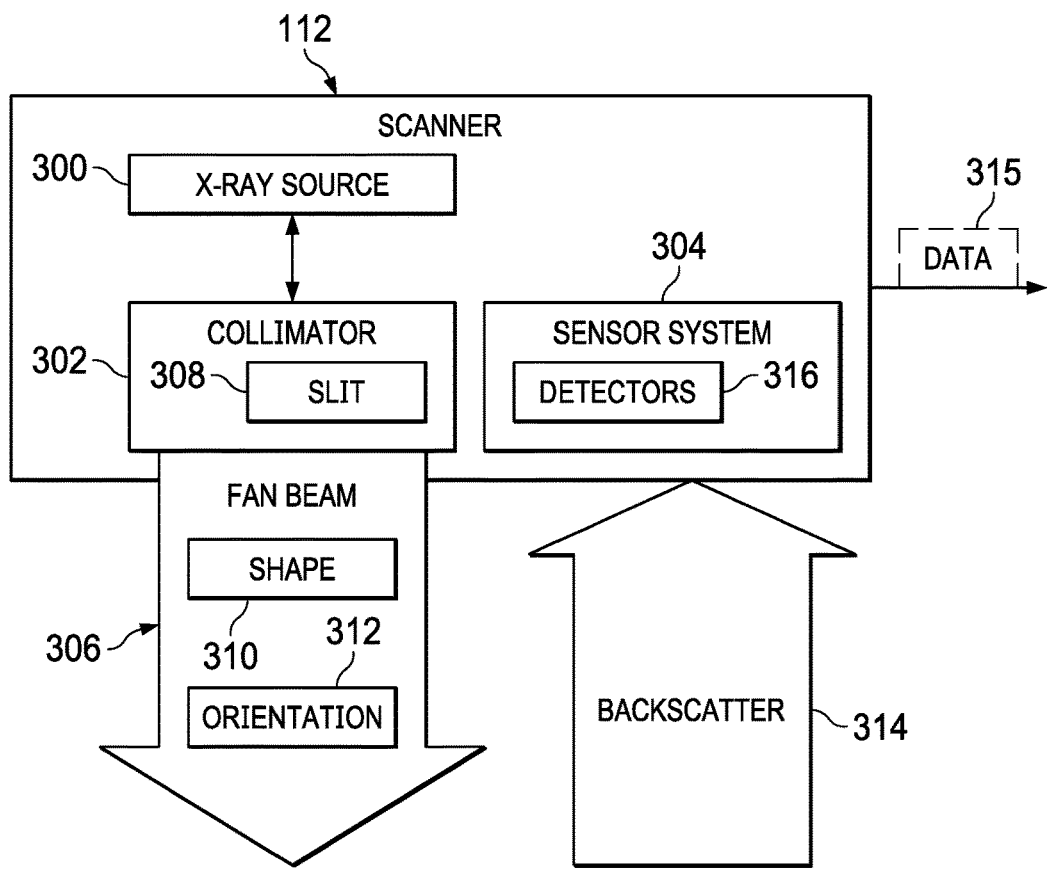
FIG. 3 is an illustration of a block diagram of a scanner in accordance with an illustrative embodiment.

With reference to FIG. 3, an illustration of a block diagram of a scanner is depicted in accordance with an illustrative embodiment. As depicted, the components in FIG. 3 illustrate one example of an implementation for scanner 112 shown in block form in FIG. 1. In this illustrative example, scanner 112 comprises x-ray source 300, collimator 302, and sensor system 304.

X-ray source 300 is a source of x-rays that are emitted from scanner 112 as fan beam 306 in this illustrative example. Fan beam 306 is an example of an implementation for x-ray beam 118 shown in block form in FIG. 1. X-ray source 300 may be an x-ray tube. In this illustrative example, scanner 112 can be implemented as a self-contained unit. For example, x-ray source 300 can include a power source needed to provide power to generate fan beam 306.

In the illustrative example, collimator 302 is a device that narrows a beam of particles or waves to form fan beam 306. For example, slit 308 is present in collimator 302 that defines shape 310 of fan beam 306. Slit 308 has a rectangular shape, in this example, that causes shape 310 of fan beam 306 to be rectangular. Further, fan beam 306 has orientation 312.

As depicted, sensor system 304 detects backscatter 314 that results from an x-ray beam, such as fan beam 306, encountering elongate structure 102 shown in block form in FIG. 1. In this illustrative example, sensor system 304 generates data 315 and sends data 315 to controller 114 shown in block form in FIG. 1.

In this illustrative example, sensor system 304 is comprised of a group of detectors 316. As depicted, the group of detectors 316 can be implemented using solid-state detectors. These detectors may be arranged in an array as pixels. The solid-state detectors may be, for example, semiconductor detectors that convert x-ray photons to an electrical charge that forms data 315. This data is in a form that allows for generating a digital image.

Figure 4:
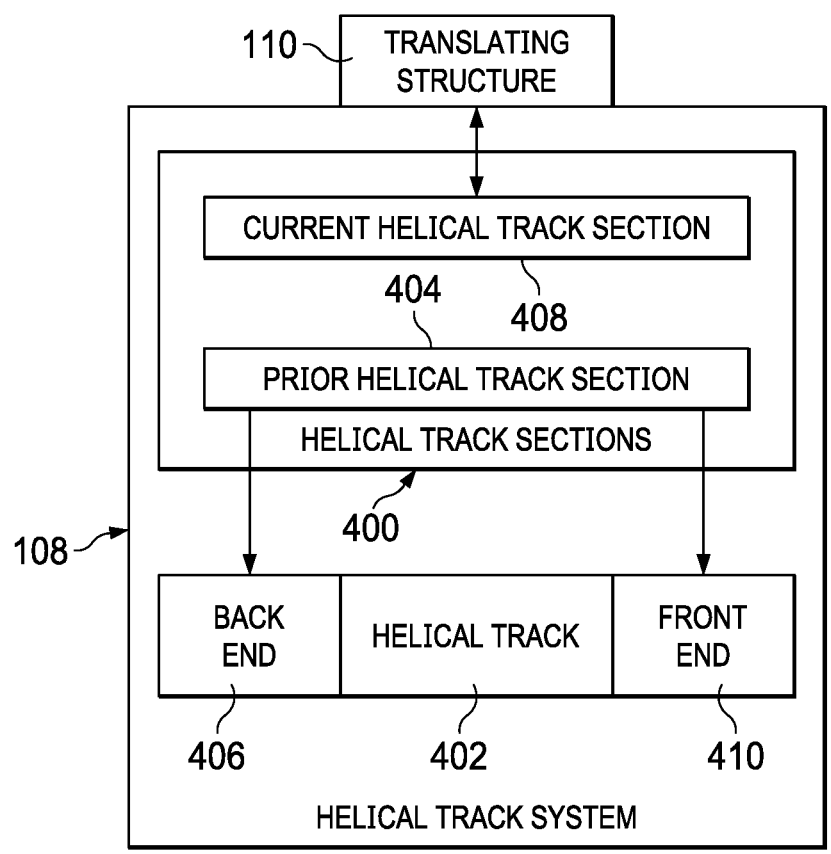
FIG. 4 is an illustration of a block diagram of a helical track system in accordance with an illustrative embodiment.

With reference now to FIG. 4, an illustration of a block diagram of a helical track system is depicted in accordance with an illustrative embodiment. FIG. 4 is an example of one implementation for helical track system 108 in FIG. 1.

In this example, helical track system 108 includes helical track sections 400. As depicted, helical track sections 400 are connected to form helical track 402. Helical track sections 400 is selected from one of single track sections and dual track sections. In the illustrative example, a section in helical track sections 400 is comprised of a chain, biased track sections, biased segments, a flexible strip, or other suitable types of track sections for placement around an elongate structure, such as a pipe.

In this example, helical track sections 400 for helical track 402 can be disassembled and reassembled along elongate structure 102 in FIG. 1 to allow translating structure 110, for scanning system 104, to move along the length of elongate structure 102 in any manner that is not limited by way of helical track system 108.

For example, prior helical track section 404 in helical track sections 400 for helical track 402 is disconnected from back end 406 of helical track 402 while translating structure 110 is on current helical track section 408 in helical track sections 400 for helical track 402. Prior helical track section 404 is reconnected to front end 410 of helical track 402.

The illustration of scanning environment 100 and the different components in this environment in FIGS. 1-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, pipe 106 may be an insulated pipe, an uninsulated pipe, or some combination thereof. For example, pipe 106 can have insulated and uninsulated sections. Further, elongate structure 102 may take other forms other than pipe 106. For example, elongate structure 102 may be selected from one of a drum, a fuel tank, a conduit, and other suitable types of elongate structures. When elongate structure 102 takes the form of a fuel tank, the fuel tank can be in or an integral part of a wing of an aircraft.

Further, although elongate structure 102 is described with respect to pipe 106, elongate structure 102 can take other forms. For example, elongate structure 102 can be selected from a drum, a conduit, a petroleum fluid tank, and an aircraft fuselage section.

Figure 5:
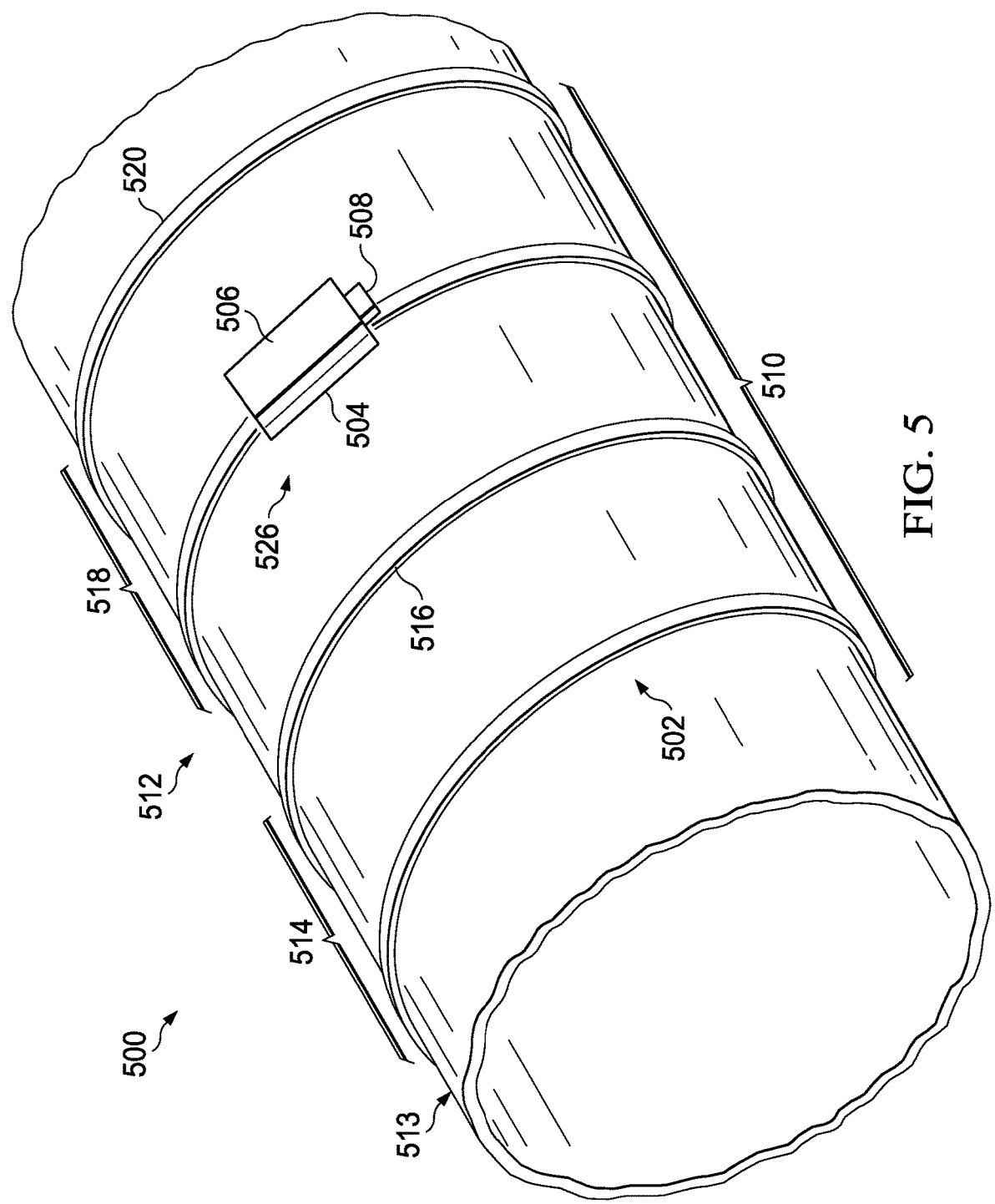
FIG. 5 is an illustration of a scanning system in accordance with an illustrative embodiment.

With reference now to FIG. 5, an illustration of a scanning system is depicted in accordance with an illustrative embodiment. In this illustrative example, scanning system 500 is an example of one physical implementation for scanning system 104 shown in block form in FIG. 1. As depicted, scanning system 500 comprises helical track system 502, translating structure 504, scanner 506, and controller 508.

Helical track system 502 is comprised of helical track sections 510 that form helical track 512 in pipe 513. In this depicted example, prior helical track section 514 in helical track sections 510 for helical track 512 is disconnected from back end 516 of helical track 512 while translating structure 504 is on current helical track section 518 in helical track sections 510 for helical track 512. Prior helical track section 514 is reconnected to front end 520 of helical track 512.

The disconnection of prior helical track section 514 from back end 516 and reconnection to front end 520 results in current helical track section 518 becoming the prior helical track section when translating structure 504 moves on to the reconnected prior helical track section. This process can be performed repeatedly until all of pipe 513 or the desired length of pipe 513 has been scanned.

Translating structure 504 moves on helical track 512 in helical track system 502 on helical path 526. During movement of scanner 506 by translating structure 504, scanner 506 emits an x-ray beam (not shown) to scan pipe 513.

Figure 6:
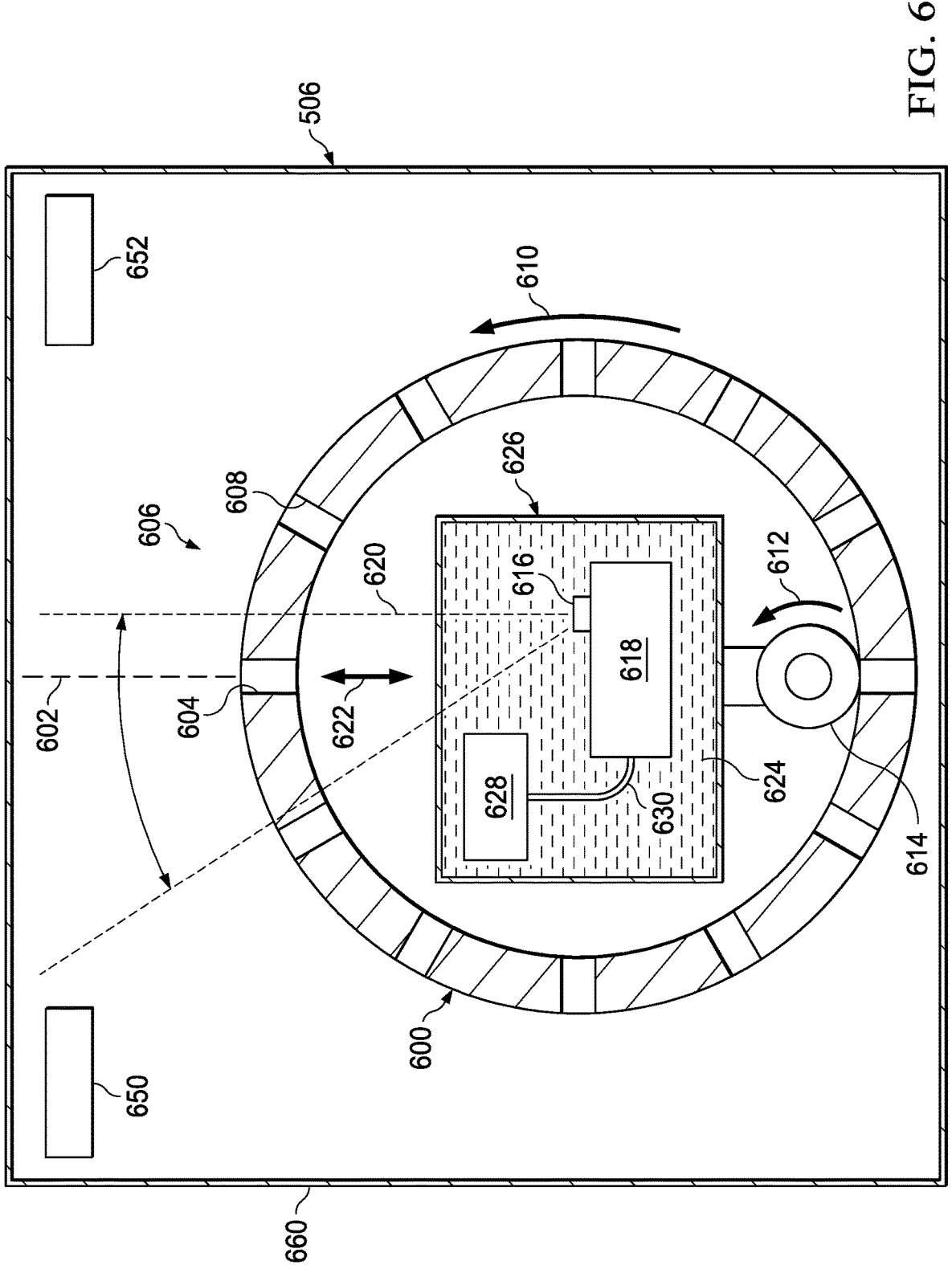
FIG. 6 is an illustration of a scanner in accordance with an illustrative embodiment.

With reference to FIG. 6, an illustration of a scanner is depicted in accordance with an illustrative embodiment. An example of one implementation for scanner 506 in FIG. 5 is shown in FIG. 6.

Scanner 506 comprises housing 626 with x-ray tube 618 located inside of housing 626. Housing 626 is connected to translating structure 504 in FIG. 5.

In operation, x-ray tube 618 generates x-rays that pass through x-ray tube 618 at window 616. The x-rays that pass through window 616 form x-ray beam 620 in this illustrative example. As a result, x-ray tube 618 is configured such that, in operation, x-ray tube 618 generates x-ray beam 620 that passes through window 616 in x-ray tube 618 towards a location on a surface of an object.

X-ray tube 618 receives high voltage output from power supply 628 via high voltage cable 630 inside of housing 626. Further, motor system 614 is connected to housing 626 in this depicted example. Motor system 614 is configured to turn in the direction of arrow 612 to rotate rotatable wheel 600.

As depicted, rotatable wheel 600 is configured to rotate in the direction of arrow 610. As rotatable wheel 600 rotates, apertures, such as aperture 604 and aperture 608, also rotate. The apertures allow a portion of x-ray beam 620 to pass through rotatable wheel 600.

In the illustrative example, a portion of x-ray beam 620 passes through aperture 604 in the form of collimated x-ray beam 602. Collimated x-ray beam 602 travels in a direction along axis 622 through aperture 604. As rotatable wheel 600 rotates in the direction of arrow 610, the portion of x-ray beam 620 that forms collimated x-ray beam 602 passing through aperture 604 may change.

In some illustrative examples, x-ray tube 618 may be connected to housing 626 such that rotation of housing 626 in the direction of arrow 612 rotates x-ray tube 618 with housing 626 in the direction of arrow 612. In these illustrative examples, X-ray tube 618 may be rotated such that the direction of x-ray beam 620 changes. In some illustrative examples, motor system 614 may be configured to rotate housing 626. In some illustrative examples, housing 626 may be rotated while rotatable wheel 600 rotates, such that the portion of x-ray beam 620 forms collimated x-ray beam 602 when passing through aperture 604.

In other illustrative examples, motor system 614 or some other motor system (not shown) may be configured to rotate at least one of a rotatable anode in x-ray tube 618, housing 626, or rotatable wheel 600.

In this illustrative example, liquid coolant 624 is located in housing 626. In particular, x-ray tube 618 and power supply 628 are located in housing 626 and are immersed in liquid coolant 624. In this example, liquid coolant 624 may be a non-conductive oil. A thermoelectric cooler (not shown in this view) may be attached to housing 626 to keep liquid coolant 624 cool during operation of x-ray system 606.

As depicted, x-ray tube 618 and power supply 628 are separated by a sufficient distance in liquid coolant 624, such that substantially no electric arc between x-ray tube 618 and power supply 628 occurs. Although power supply 628 is generally depicted as a box, power supply 628 is formed of several individual components which are not individually depicted.

Further, in some illustrative examples, the components of power supply 628 may be in direct contact with liquid coolant 624. Some illustrative examples of components of power supply 628 may include at least one of a thermal shutdown circuit, a feedback current system for maintaining a constant output, a high voltage fly back, a high voltage transformer, a high voltage rectifier, a high voltage capacitor, a high voltage transistor, and a high voltage resistor.

Scanner 506 also includes detector 650 and detector 652. These detectors detect backscatter (not shown) that results from x-ray beam 620 encountering an elongate structure, such as a pipe. The data generated by detector 650 and detector 652 can be sent to controller 508 in FIG. 5 by a wireless connection in this example.

All of the components for scanner 506 are located in main housing 660. Main housing 660 is associated with translating structure 504 in FIG. 5.

Figure 7:
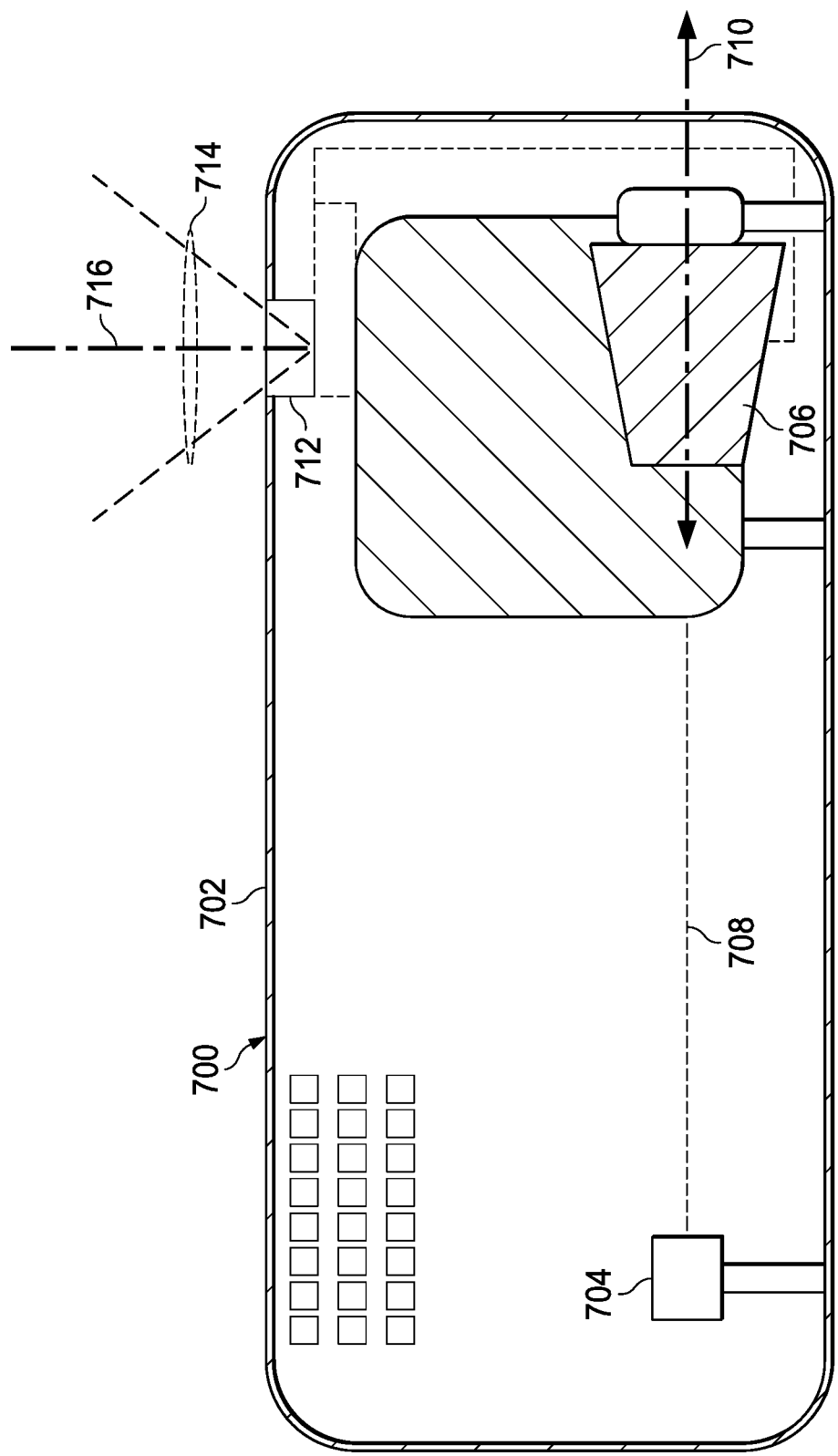
FIG. 7 is an illustration of a side view of an x-ray tube in accordance with an illustrative embodiment.

With reference next to FIG. 7, an illustration of a side view of an x-ray tube is depicted in accordance with an illustrative embodiment. X-ray tube 700 is an example of one implementation for x-ray source 300 in FIG. 3.

As depicted, x-ray tube 700 takes the form of vacuum tube 702. Vacuum tube 702 has cathode 704 that is configured to emit electrons 708 that collide with rotatable anode 706. Rotatable anode 706 generates x-rays in response to receiving electrons 708.

In this illustrative example, rotatable anode 706 is configured to rotate about axis 710. As depicted, the portion of x-rays generated by rotatable anode 706 that pass through window 712 in vacuum tube 702 form x-ray beam 714. X-ray beam 714 travels in a direction along axis 716 in this depicted example.

As rotatable anode 706 rotates about axis 710, the angle at which electrons 708 collide with rotatable anode 706 changes. Thus, the direction in which x-ray beam 714 travels may be changed by rotating rotatable anode 706. In this manner, rotatable anode 706 is configured to direct x-ray beam 714 to scan an object.

Figure 8:
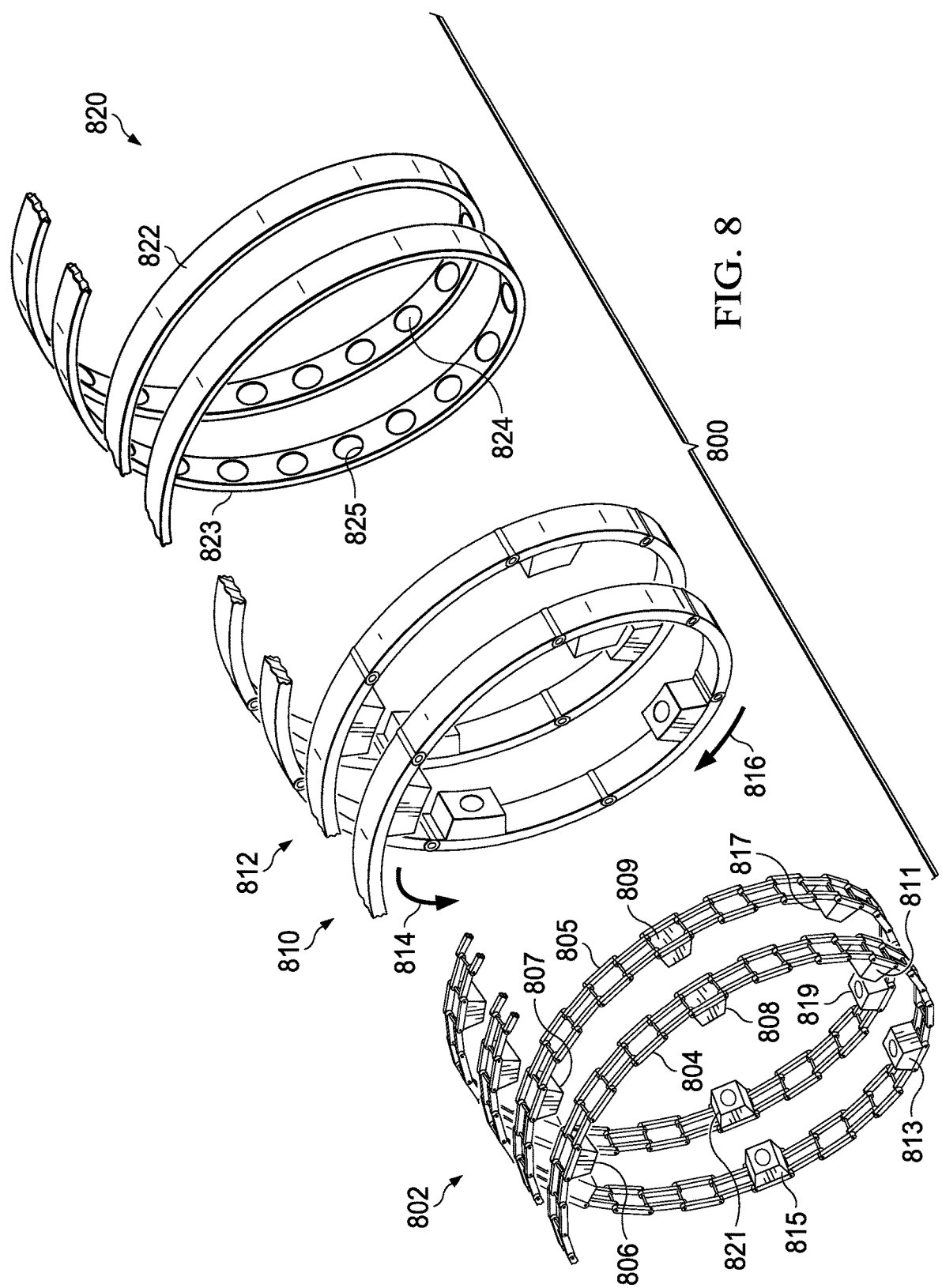
FIG. 8 is an illustration of a portion of a helical track section in accordance with in illustrative embodiment.

With reference next to FIG. 8, an illustration of a portion of a helical track section is depicted in accordance with in illustrative embodiment. In this depicted example, helical track sections 800 is a portion of a helical track section, such as prior helical track section 404 and current helical track section 408 in helical track sections 400 for helical track 402 in FIG. 4. In the illustrative examples, helical track sections 400 in FIG. 4 can take a number different forms, as shown by helical track sections 800.

For example, helical track section 802 in helical track sections 800 comprises chain 804 and chain 805 on which a translating structure can be attached and used to move a scanner on a helical path. Vacuum unit 806, vacuum unit 808, vacuum unit 811, vacuum unit 813, and vacuum unit 815 are connected to chain 804. As depicted, vacuum unit 807, vacuum 809, vacuum unit 817, vacuum unit 819, and vacuum unit 821 are connected to chain 805 and can apply a vacuum to connect helical track section 802 to the surface of an elongate structure, such as a pipe.

As another example, helical track section 810 in helical track sections 800 is comprised of biased sections 812 that are biased in the direction of arrow 814 and arrow 816 to hold helical track section 810 on an elongate structure, such as a pipe. This type of helical track section also may include vacuum units, in some illustrative examples, to aid in holding helical track section 810 on the elongate structure.

As another example, helical track section 820 in helical track sections 800 can take the form of flexible strip 822 and flexible strip 823. These flexible strips are comprised of a material that can be selected from at least one of plastic, rubber, or some other suitable type of material that is configured to wrap around an elongate structure, such as a pipe. In this depicted example, vacuum ports 824 are formed within flexible strip 822 and vacuum ports 825 are formed within flexible strip 823 through which a vacuum can be applied to attach flexible strip 822 and flexible strip 823 on an elongate structure, such as a pipe.

As depicted, helical track sections 800 extends parallel to form a flexible dual track system. In other examples, helical flexible track sections not in parallel may be used for a flexible single track system.

The illustration of scanning system 500 and the different components in the systems depicted in FIGS. 5-8 are provided as an example of one manner in which scanning system 104 shown in block form in FIG. 1 can be implemented. The illustrative examples are not meant to limit the manner in which other scanning systems can be implemented.

For example, although two helical track sections are depicted in this illustrative example, other illustrative examples may have other numbers of helical track sections. For example, three helical track sections, five helical track sections, six helical track sections, or some other number of helical track sections can be used in other implementations.

In yet another example, an x-ray tube without a rotatable anode can be used in scanner 112 in FIG. 1.

In yet other illustrative examples, helical track sections 800 in FIG. 8 are shown as dual track sections. In other illustrative examples, a single track section or a triple track section can be used in place of the dual track sections illustrated for helical track sections 800 in FIG. 8.

Figure 9:
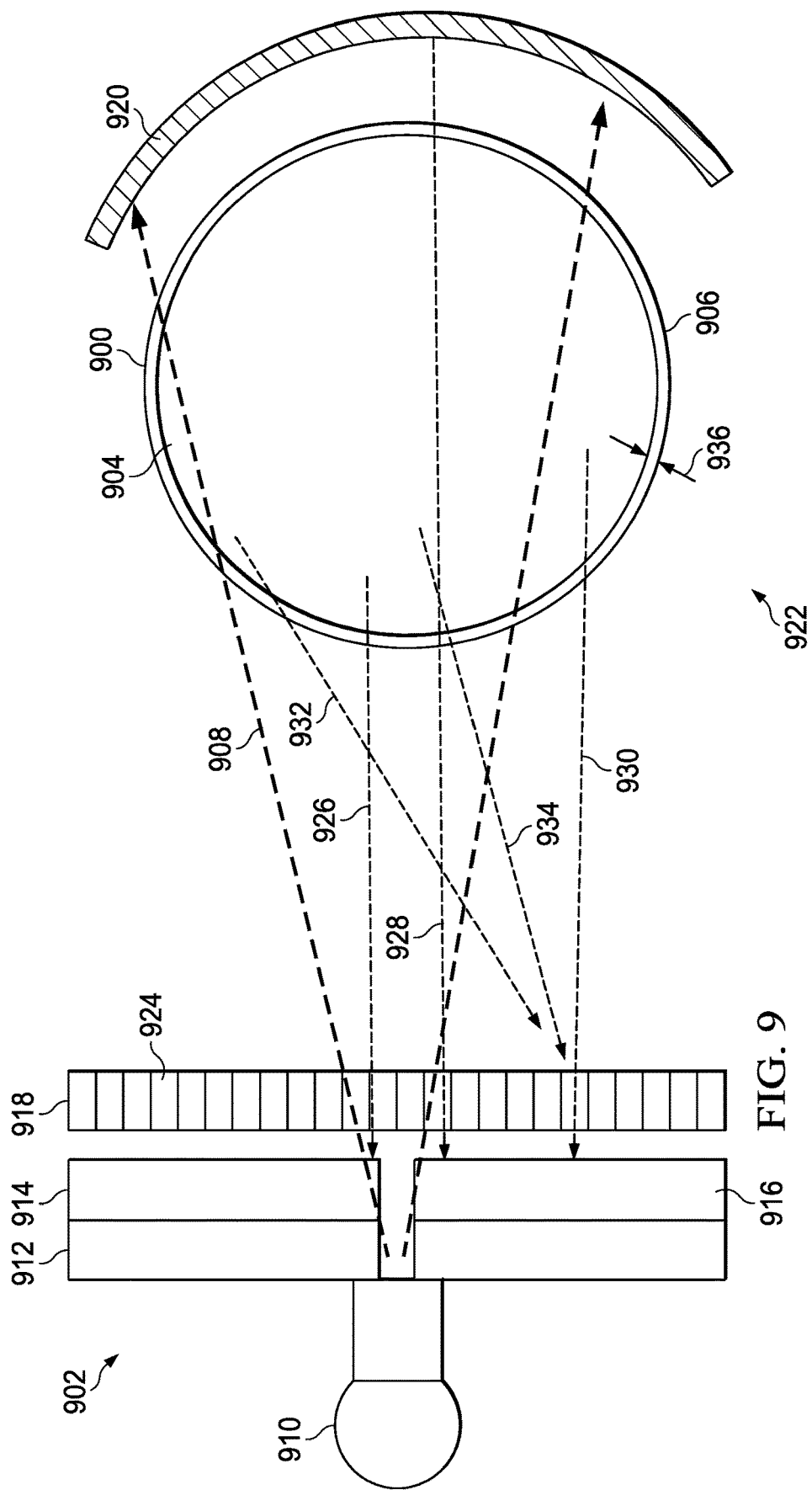
FIG. 9 is an illustration of a cross-sectional view of a scanner positioned to scan a pipe in accordance with an illustrative embodiment.

With reference to FIG. 9, an illustration of a cross-sectional view of a scanner positioned to scan a pipe is depicted in accordance with an illustrative embodiment. In this illustrative example, a cross-section of pipe 900 with scanner 902 positioned relative to pipe 900 is shown. Scanner 902 is an example of one implementation for scanner 112 shown in block form in FIG. 1.

As depicted, pipe 900 includes cavity 904 filled with oil 906. Cavity 904 is shown as being fully filled with oil 906. An inconsistency in pipe 900 can be detected by using fan beam 908 emitted from scanner 902.

In this illustrative example, scanner 902 includes a number of different components. As shown in this figure, scanner 902 includes x-ray source 910, collimator 912, detector 914, detector 916, polarization grid 918, and shield 920.

In this illustrative example, collimator 912 shapes x-ray energy to form fan beam 908 that is directed towards pipe 900. Scanning of pipe 900 with fan beam 908 results in backscatter 922. In this illustrative example, backscatter 922 is comprised of signals reflected off of items, such as pipe 900 and oil 906.

As depicted, polarization grid 918 reduces the amount of backscatter 922 that reaches detector 914 and detector 916. Polarization grid 918 is configured to pass x-rays in backscatter 922 that travel in a direction that is substantially perpendicular to surface 924 of polarization grid 918. For example, signal 926, signal 928, and signal 930 in backscatter 922 pass through polarization grid 918 to reach detector 914 and detector 916. In contrast, signal 932 and signal 934 in backscatter 922 do not pass through polarization grid 918.

The use of polarization grid 918 provides an ability to pass signals in backscatter 922 that are reflected substantially directly from pipe 900 in response to fan beam 908. Rotating or moving scanner 902 can provide signals from the other portions of pipe 900.

Further, shield 920 is configured to reduce backscattering. In this example, the elongate structure, pipe 900, is located between x-ray source 910 and shield 920.

As depicted, shield 920 is comprised of a material in a structure that is positioned to absorb or reduce the backscattering of the portion of fan beam 908 that passes through pipe 900. For example, shield 920 can be comprised of a material such as lead, concrete, osmium, gold, or some other material with a suitable density or atomic weight for absorbing x-ray radiation.

Thus, backscatter 922 from other items in the environment other than pipe 900 or oil 906 is reduced. As a result, noise caused by other items may be reduced through the use of shield 920.

In one illustrative example, inconsistencies can be detected in pipe 900 by detecting wall thickness 936. For example, variations in wall thickness 936 in pipe 900 can be caused by inconsistencies, such as, at least one of a crack, corrosion, oxidization, pitting, buildups, spalling, delamination, a void, or other undesired inconsistencies in pipe 900.

In this illustrative example, the presence of fluids in the form of oil 906 can make detecting inconsistencies in pipe 900 more difficult. By implementing scanner 902 using a controller, such as controller 114 in FIG. 1, the detection of inconsistencies in pipe 900 can be performed more easily as compared to current systems and techniques for scanning pipes or other elongate structures having a cavity in which fluids may be present.

The illustration of scanner 902 and pipe 900 in FIG. 9 is presented for purposes of illustrating one manner in which an illustrative example can be implemented. The illustration in FIG. 9 is not meant to limit the manner in which other illustrative examples can be implemented. For example, shield 920 may be considered a separate component from scanner 902 and may be omitted in other implementations. In still another illustrative example, polarization grid 918 may be omitted.

As still another example, pipe 900 may be empty or partially filled with oil 906. In yet other illustrative examples, other types of fluids may be present. These fluids may include, for example, a natural gas in a liquid form, a natural gas in a gas form, water, gasoline, or other types of liquids.

Figure 10:
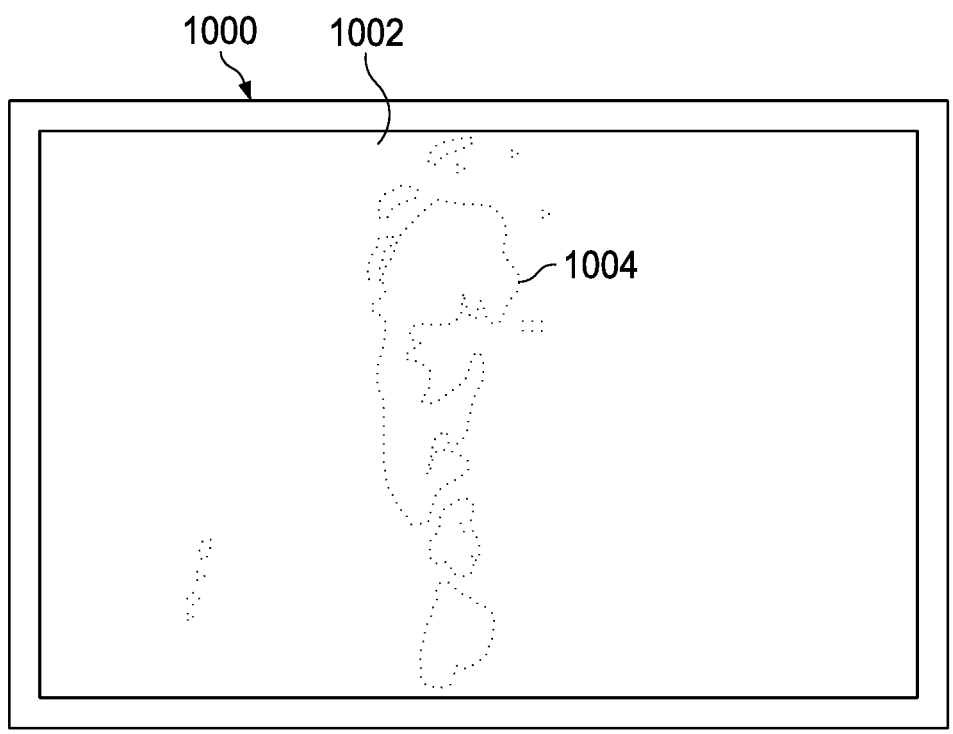
FIG. 10 is an illustration of an image generated from a scan of a pipe filled with a fluid in accordance with an illustrative embodiment.

With reference next to FIG. 10, an illustration of an image generated from a scan of a pipe filled with a fluid is depicted in accordance with an illustrative embodiment. In this illustrative example, image 1000 is an example of an image that is generated using data obtained from a scan of an elongate structure, such as a pipe. The scan involves detecting backscattering of an x-ray beam directed towards the pipe. In this example, image 1000 is of a pipe filled with a fluid.

As depicted, image 1000 includes fluid 1002 and inconsistency 1004. In this example, inconsistency 1004 is difficult to detect in image 1000 because of the presence of fluid 1002 in the pipe.

Figure 11:
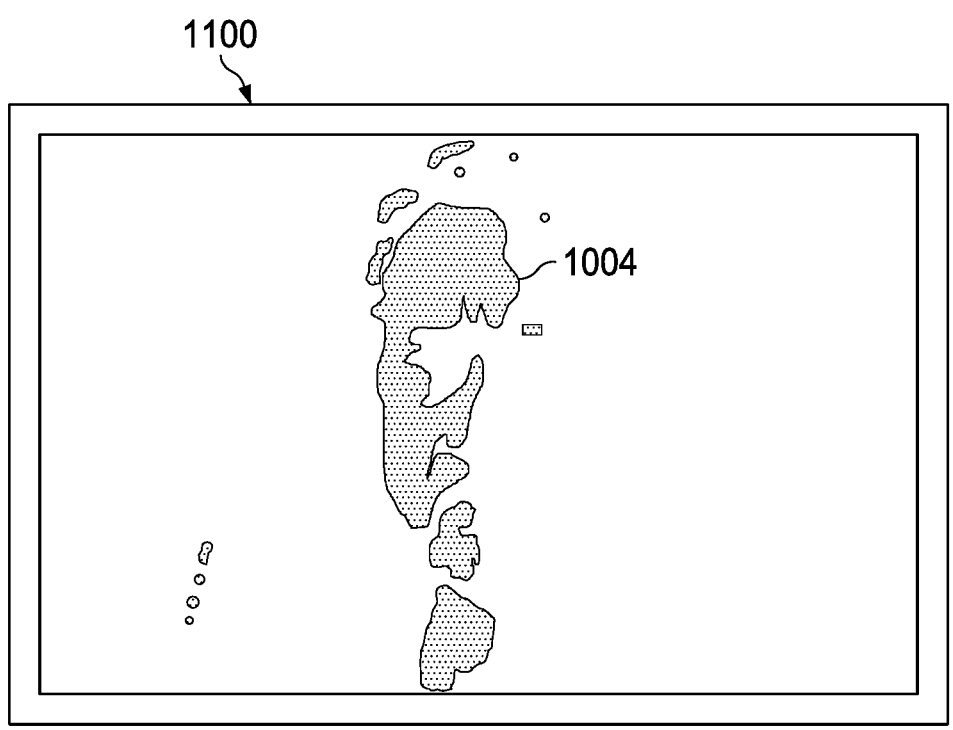
FIG. 11 is an illustration of an image generated from filtering data from a scan of a pipe in accordance with an illustrative embodiment.

With reference next to FIG. 11, an illustration of an image generated from filtering data from a scan of a pipe is depicted in accordance with an illustrative embodiment. In this illustrative example, image 1100 is a result of processing data from a scan of a pipe. The processing is performed using a controller, such as controller 114 shown in block form in FIG. 1. The data from the scan is filtered to remove a portion of the data in the scan that is attributable to the fluid in the pipe. As a result, inconsistency 1004 is much clearer in image 1100 as compared to image 1000 in FIG. 10.

Figure 12:
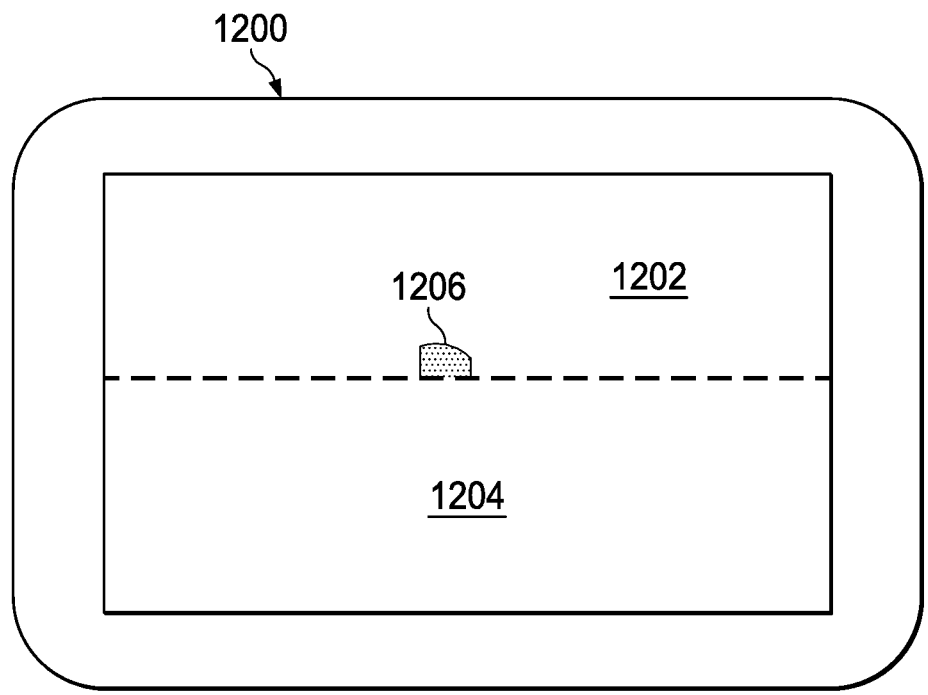
FIG. 12 is an illustration of an image generated from a scan of a pipe partially filled with a fluid in accordance with an illustrative embodiment.

With reference next to FIG. 12, an illustration of an image generated from a scan of a pipe partially filled with a fluid is depicted in accordance with an illustrative embodiment. In this example, image 1200 is generated using data obtained from a scan of an elongate structure, such as a pipe, that is partially filled with a fluid. The scan involves detecting backscattering of an x-ray beam directed towards the pipe. In this illustrative example, section 1202 represents the portion of the pipe that is empty while section 1204 represents the portion of the pipe in which the fluid is present.

In this depicted example, a portion of inconsistency 1206 can be seen in section 1202 in image 1200. The portion of inconsistency 1206 located in section 1204 of image 1200 of the pipe is not readily detectable in image 1200.

Figure 13:
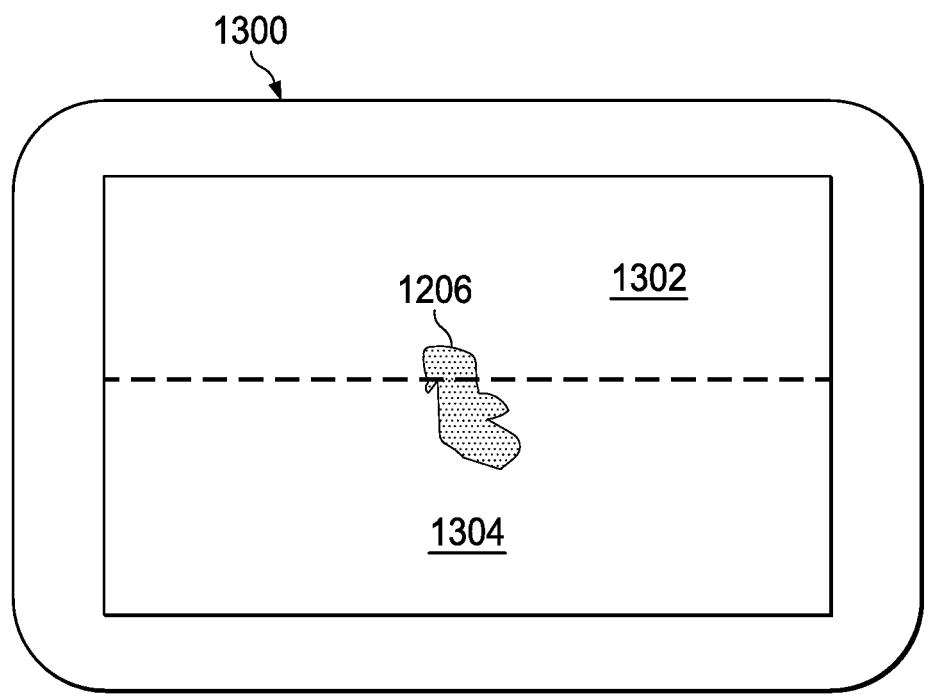
FIG. 13 is an illustration of an image generated from filtering data from a scan of a pipe in accordance with an illustrative embodiment.

With reference next to FIG. 13, an illustration of an image generated from filtering data from a scan of a pipe is depicted in accordance with an illustrative embodiment. In this illustrative example, image 1300 is a result of processing data from a scan of a pipe.

Section 1302 represents data from the section of the pipe in which fluid is absent. Section 1304 represents the section of the pipe in which fluid is present. The data in section 1304 is filtered to remove portions of the data that are attributable to the presence of the fluid in the pipe.

In this example, the filtering is performed using a high-pass filtering process to subtract the portion of signal in the backscatter detected by the detector to form the data for image 1300. In this example, inconsistency 1206 can now be seen more clearly in image 1300 as compared to image 1200 in FIG. 12.

The illustrations of images in FIGS. 10-13 are provided to depict some images that can be generated using data from a scan of a pipe. These illustrations are not meant to limit the manner in which the illustrative examples can be implemented. For example, other images may be for any elongate structure such as a fuel tank integrated in a wing of an aircraft in which the fluid is an aircraft fuel. Thus, the illustrative examples enable more accurate and complete detection of an inconsistency that may be present in elongate structures containing a fluid.

Figure 14:
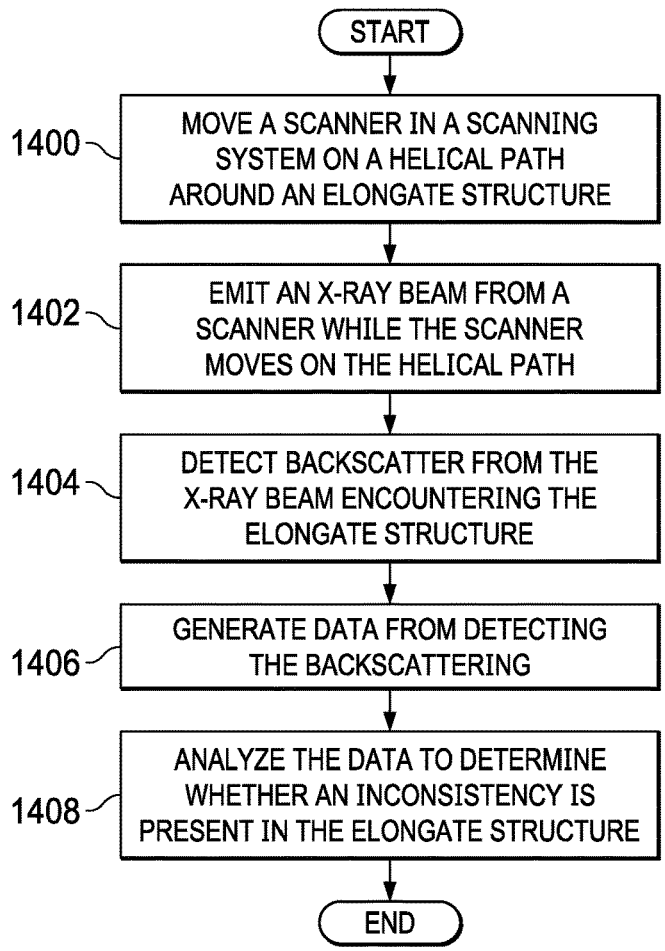
FIG. 14 is an illustration of a flowchart of a process for scanning an elongate structure in accordance with an illustrative embodiment.

Turning next to FIG. 14, an illustration of a flowchart of a process for scanning an elongate structure is depicted in accordance with an illustrative embodiment. The process illustrated in FIG. 14 can be implemented using scanning system 104 in FIG. 1.

The process begins by moving a scanner in a scanning system on a helical path around the elongate structure (operation 1400). In this operation, the scanner is moved on the helical path around an elongate structure using a helical track system attached to the elongate structure using a translating structure.

The process emits an x-ray beam from a scanner while the scanner moves on the helical path (operation 1402). The x-ray beam can be a fan beam or take some other form in this depicted example.

The process detects backscatter from the x-ray beam encountering the elongate structure (operation 1404). The process generates data from detecting the backscattering (operation 1406). The process analyzes the data to determine whether an inconsistency is present in the elongate structure (operation 1408). The process terminates thereafter.

With the detection of the inconsistency, an action can be performed. The action can be selected from a group comprising reworking the elongate structure, replacing a portion of the elongate structure, replacing the elongate structure, inspecting the elongate structure, performing another scan of the elongate structure, adding the location and identification of the inconsistency to a report, and other suitable actions.

Figure 15:
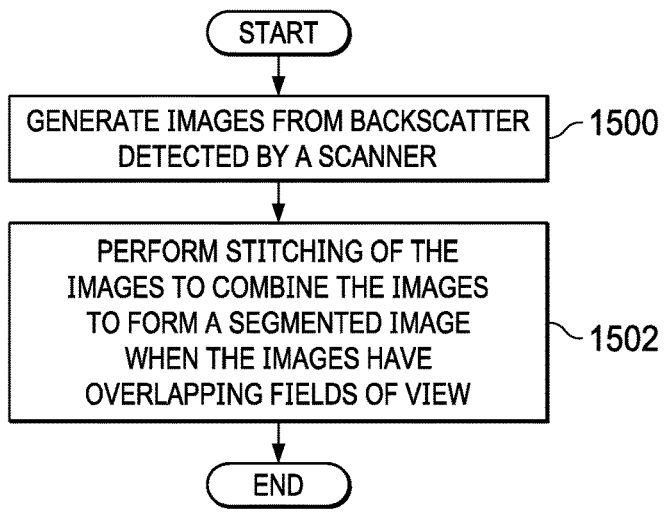
FIG. 15 is an illustration of a flowchart of a process for processing images from a scan of an elongate structure in accordance with an illustrative embodiment.

Turning next to FIG. 15, an illustration of a flowchart of a process for processing images from a scan of an elongate structure is depicted in accordance with an illustrative embodiment. The process illustrated in FIG. 15 can be implemented in controller 114 or some other data processing system in communication with controller 114 in FIG. 1. The different operations can be implemented using one of software or hardware. If software is used, the process can be implemented using program code run by a processor unit in which the program code contains instructions for the different operations in this process.

The process begins by generating images from backscatter detected by a scanner (operation 1500). The process performs stitching of the images to combine the images to form a segmented image when the images have overlapping fields of view (operation 1502). The process terminates thereafter.

Figure 16:
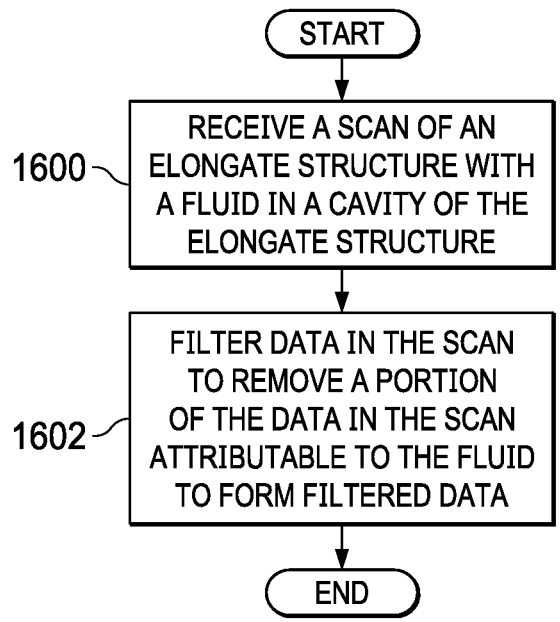
FIG. 16 is an illustration of a flowchart of a process for scanning an elongate structure in accordance with an illustrative embodiment.

Turning next to FIG. 16, an illustration of a flowchart of a process for scanning an elongate structure is depicted in accordance with an illustrative embodiment. The process illustrated in FIG. 16 can be implemented in scanning environment 100 in FIG. 1. The process can be implemented using controller 114 in scanning system 104 in FIG. 1. The different operations can be implemented in at least one of software or hardware. For example, the different operations can be implemented using software, hardware, or some combination thereof. When software is used, the different operations can be implemented in program code to cause a processor unit to perform the operations.

The process begins by receiving a scan of an elongate structure with a fluid in a cavity of the elongate structure (operation 1600). The scan in operation 1600 is generated by a scanner using an x-ray beam.

The process filters data in the scan to remove a portion of the data in the scan attributable to the fluid to form filtered data (operation 1602). The process terminates thereafter. This enables detecting an inconsistency on a wall of the elongate structure in the filtered data. This inconsistency can be on the inner or outer wall of the elongate structure. For example, this process can enables detecting an inconsistency on an interior side of a back wall of the elongate structure carrying a fluid.

Figure 17:
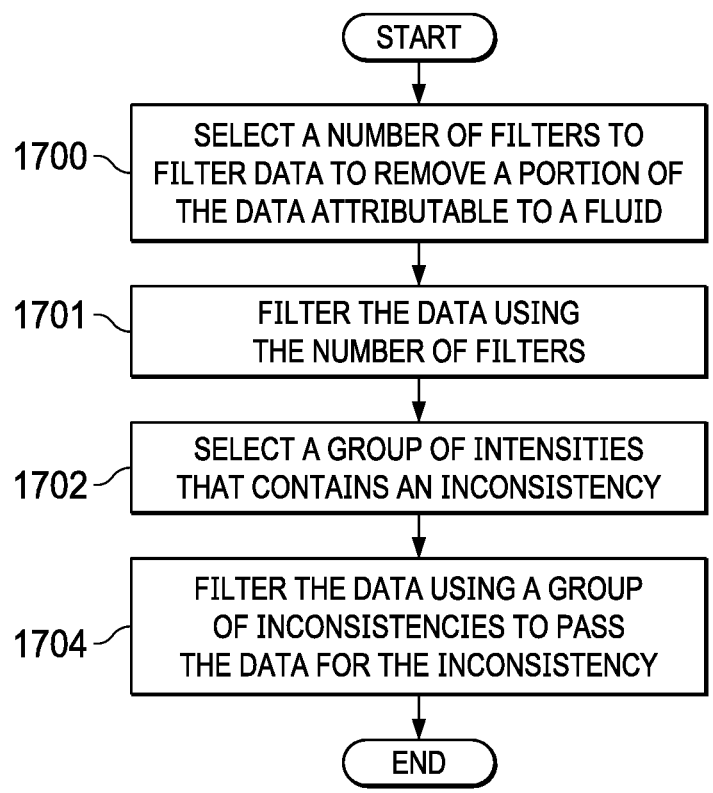
FIG. 17 is an illustration of a flowchart of a process for filtering data in a scan in accordance with an illustrative embodiment.

With reference now to FIG. 17, an illustration of a flowchart of a process for filtering data in a scan is depicted in accordance with an illustrative embodiment. The process in FIG. 17 is an example of one implementation for operation 1602 in FIG. 16.

In this illustrative example, the data in the scan comprises pixels in which the pixels indicate intensities of a backscatter of an x-ray beam detected by a scanner, wherein the intensities correspond to energy of the backscatter, and wherein the controller filters the data to remove intensities associated with the fluid. In this example, the intensity of a pixel increases as the energy of a signal in the backscatter detected at a pixel in the detector increases.

The process selects a number of filters to filter data to remove a portion of the data attributable to a fluid (operation 1700). The number of filters can be selected from at least one of a high-pass filter, a low-pass filter, a bandpass filter, or some other suitable type of filter. The type of filter or filters selected can be based on what frequencies are to be removed from the data in the image. In other words, the filters can be selected to pass data for pixels in a manner that enhances data for inconsistencies. This type of filtering can be performed in a number of different ways. For example, a Fourier transform low-pass filter or a Fourier transform high-pass filter can be used. For example, if the liquid and other background is at a higher filter than the inconsistency, a low-pass filter can be used to remove data for the liquid and other background elements. Other background elements may include, for example, intensities for backscatter detected from welding repairs, brackets in the grid, the grid structure, or other elements that can cause backscatter that can mask or act as noise, making detecting the inconsistency more difficult. The type of filter or filters can be selected to remove repeatable sections with substantially uniform intensities in the data such as those attributable to a liquid.

The process filters the data using the number of filters (operation 1701). This operation removes the portion of the data attributable to the fluid in the elongate structure. The filtering in operation 1701 can also be used to remove data attributable to other elements that form background noise.

The process selects a group of intensities that contains an inconsistency (operation 1702). The group of intensities can be selected using a standard for the inconsistency. The standard can be a material that comprises the inconsistency that is to be detected, or a material that mimics the inconsistency. The standard can be placed against the wall of the elongate structure and the elongate structure with the standard can be scanned. The wall can be an interior or exterior wall of the elongate structure without a fluid. In some illustrative examples, another elongate structure having the same specifications as the elongate structure to be inspected can be used with the standard.

The process filters the data using a group of inconsistencies to pass the data for the inconsistency (operation 1704). The process terminates thereafter.

Figure 18:
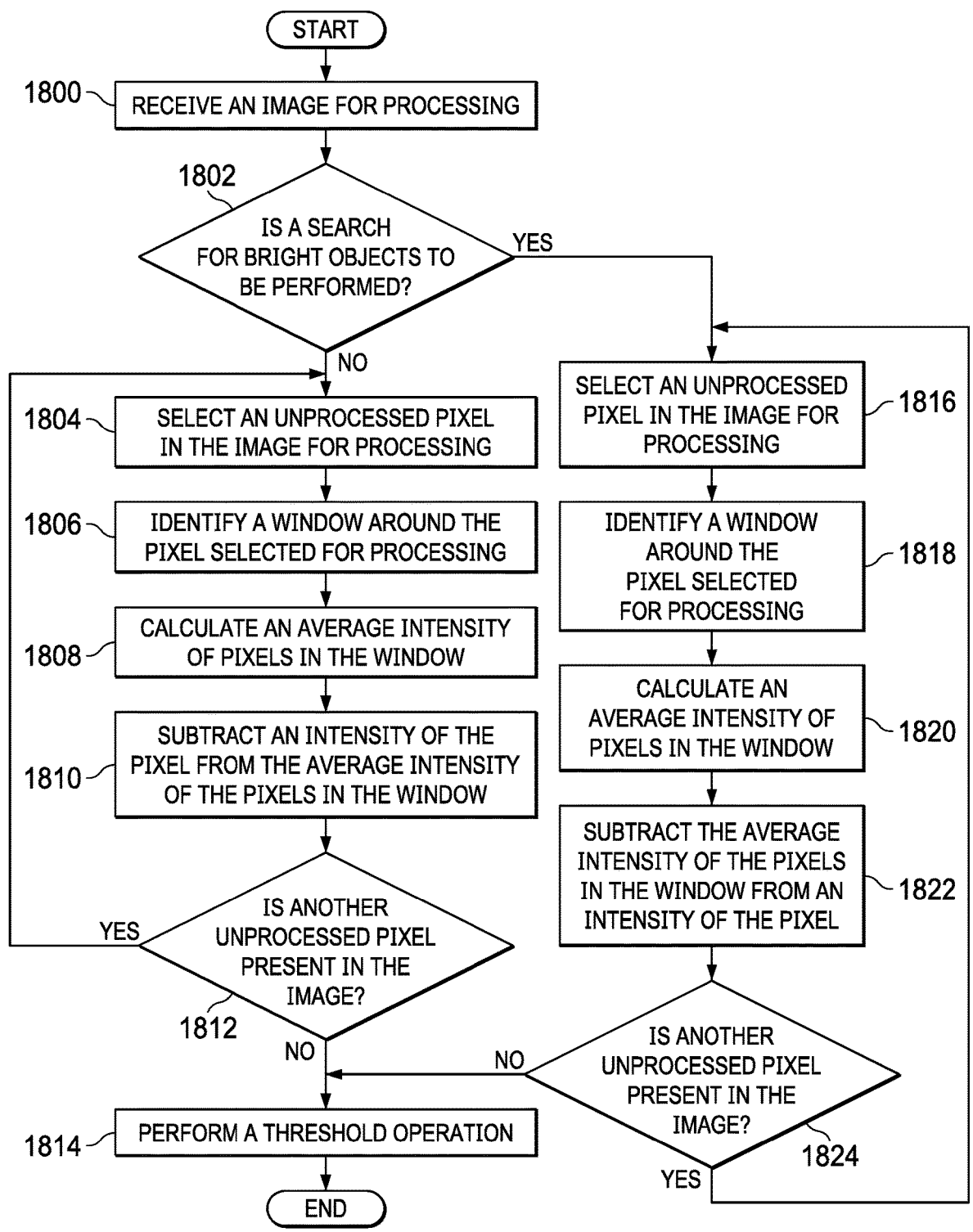
FIG. 18 is an illustration of a flowchart of process for identifying frequencies used for filtering data from a scan of an elongate structure containing a fluid in accordance with an illustrative embodiment.

With reference to FIG. 18, an illustration of a flowchart of process for identifying frequencies used for filtering data from a scan of an elongate structure containing a fluid is depicted in accordance with an illustrative embodiment. The process illustrated in FIG. 18 is an example of operations that can be used to implement operation 1600 in FIG. 16.

The process begins by receiving an image for processing (operation 1800). In operation 1800, the image is obtained from data in the scan when the sensor comprises pixels that detect backscatter.

A determination is made as to whether a search for bright objects is to be performed (operation 1802). In operation 1802, the process determines whether the inconsistency is brighter than other objects in the scan. In this example, a bright object is an object of interest, such as an inconsistency, in the data that has a higher intensity than other objects that may present. When the types of inconsistencies are known, whether those consistency show up as a bright object or not can determined for use in filtering the image.

For example, the frequencies for filtering can be determined based on identifying frequencies for the liquid in a histogram of intensities for the image and selecting filters to remove those frequencies for the liquid.

If the process is not searching for bright objects, the process selects an unprocessed pixel in the image for processing (operation 1804). The process identifies a window around the pixel selected for processing (operation 1806). The window can be square, rectangular, or any shape encompassing the pixel. The pixel is centrally located in the window in this example.

The process calculates an average intensity of pixels in the window (operation 1808). The process subtracts an intensity of the pixel from the average intensity of the pixels in the window (operation 1810).

A determination is made as to whether another unprocessed pixel is present in the image (operation 1812). If another unprocessed pixel is present in the image, the process returns to operation of 1804.

Otherwise, the process performs a threshold operation (operation 1814). In operation 1814, the process selects a number of frequencies for the inconsistency for a threshold. In other words, the threshold may have more than one frequency depending on the frequency response of the inconsistency or inconsistencies for which the scan is performed. This threshold removes the data for other items other than the inconsistency.

In this illustrative example, the threshold can be based on a lookup table. The lookup table can provide one or more frequencies for the threshold value based on the characteristics of the pipe, the liquid, and the inconsistencies. This lookup table can be generated using a standard for the inconsistency with a pipe and liquid have the same characteristics as the pipe being inspected. The process terminates thereafter.

With reference again to operation 1802, if a search for bright objects is to be performed, the process selects an unprocessed pixel in the image for processing (operation 1816). The process identifies a window around the pixel selected for processing (operation 1818). The window can be square, rectangular, or any shape encompassing the pixel. The pixel is centrally located in the window in this example.

The process calculates an average intensity of pixels in the window (operation 1820). The process subtracts the average intensity of the pixels in the window from an intensity of the pixel (operation 1822).

The process determines whether another unprocessed pixel is present in the image (operation 1824). If another unprocessed pixel is present in the image, the process returns to operation of 1816. Otherwise, the process proceeds to operation 1814 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 19:
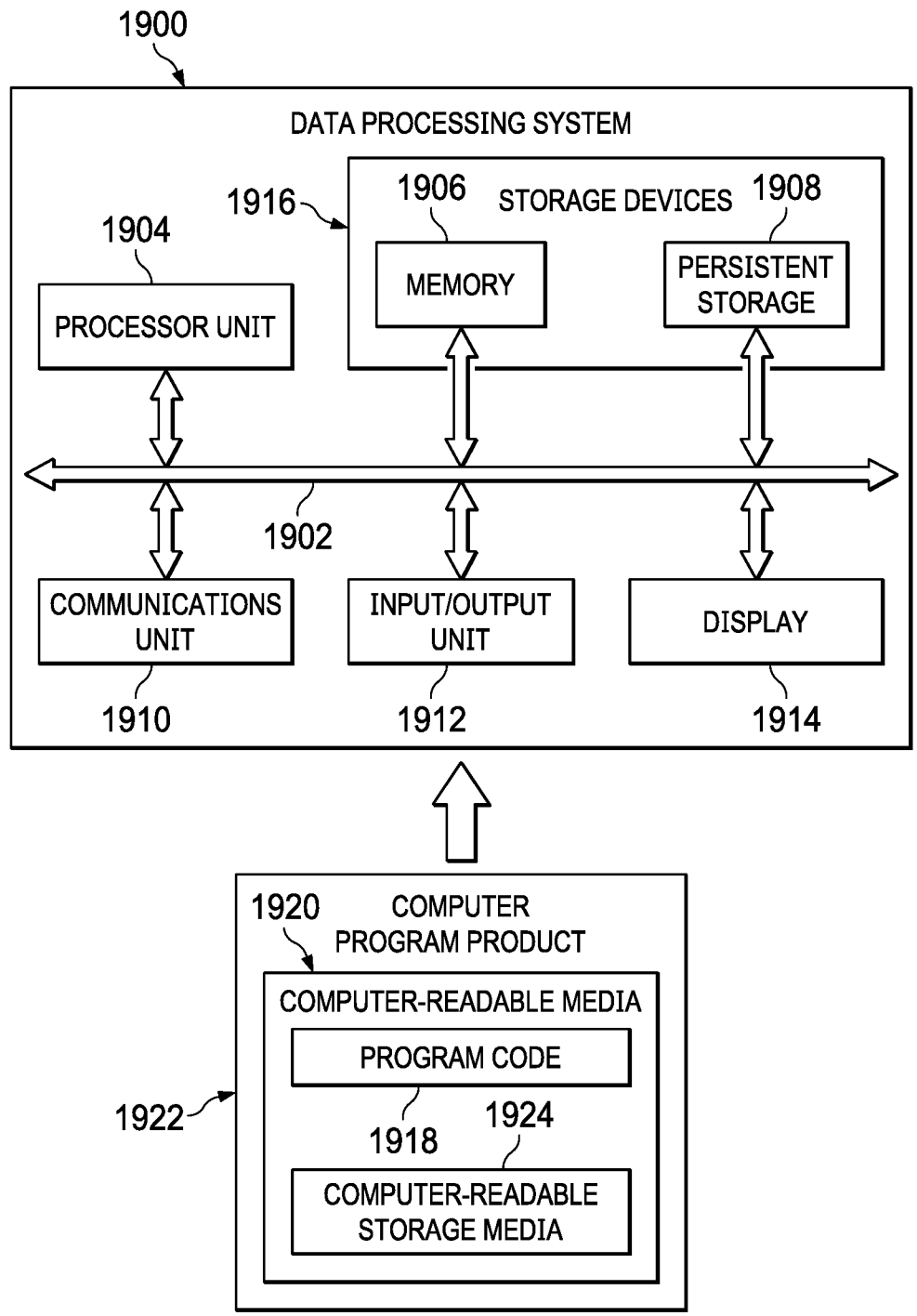
FIG. 19 is an illustration of a block diagram of a data processing system in accordance with an illustrative embodiment.

Turning now to FIG. 19, an illustration of a block diagram of a data processing system is depicted in accordance with an illustrative embodiment. Data processing system 1900 may be used to implement computer system 122 in FIG. 1. In this illustrative example, data processing system 1900 includes communications framework 1902, which provides communications between processor unit 1904, memory 1906, persistent storage 1908, communications unit 1910, input/output unit 1912, and display 1914. In this example, communications framework 1902 may take the form of a bus system.

Processor unit 1904 serves to execute instructions for software that may be loaded into memory 1906. Processor unit 1904 may be a number of processors, a multi-processor core, or some other type of processor, depending on the particular implementation.

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1916 may also be referred to as computer-readable storage devices in these illustrative examples. Memory 1906, in these examples, may be, for example, a random-access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a solid-state drive (SSD), a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that may be connected to data processing system 1900. For example, input/output unit 1912 may provide a connection for user input through at least one of a keyboard, a mouse, or some other suitable input device. Further, input/output unit 1912 may send output to a printer. Display 1914 provides a mechanism to display information to a user.

Instructions for at least one of the operating system, applications, or programs may be located in storage devices 1916, which are in communication with processor unit 1904 through communications framework 1902. The processes of the different embodiments may be performed by processor unit 1904 using computer-implemented instructions, which may be located in a memory, such as memory 1906.

These instructions are referred to as program code, computer usable program code, or computer-readable program code that may be read and executed by a processor in processor unit 1904. The program code in the different embodiments may be embodied on different physical or computer-readable storage media, such as memory 1906 or persistent storage 1908.

Program code 1918 is located in a functional form on computer-readable media 1920 that is selectively removable and may be loaded onto or transferred to data processing system 1900 for execution by processor unit 1904. Program code 1918 and computer-readable media 1920 form computer program product 1922 in these illustrative examples. In the illustrative example, computer-readable media 1920 is computer-readable storage media 1924.

In these illustrative examples, computer-readable storage media 1924 is a physical or tangible storage device used to store program code 1918 rather than a medium that propagates or transmits program code 1918.

Alternatively, program code 1918 may be transferred to data processing system 1900 using a computer-readable signal media. The computer-readable signal media may be, for example, a propagated data signal containing program code 1918. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1900 are not meant to provide architectural limitations to the manner in which different embodiments may be implemented. The different illustrative embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code 1918.

Thus, the illustrative examples provide a method, an apparatus, and a system for scanning an elongate structure. In one illustrative example, a scanning system comprises a helical track system, a translating structure, and a scanner. The helical track system is configured to be placed around an elongate structure. The elongate structure may be, for example, a pipe. The translating structure is configured to move on the helical track system on a helical path. The scanner is connected to the translating structure, wherein the scanner is configured to emit an x-ray beam.

Further, the illustrative examples provide a method, an apparatus, and a system for scanning an elongate structure having a cavity with a liquid. Data in a scan of the elongate structure can be filtered to remove a portion of the data in the scan attributable to the fluid, enabling detecting an inconsistency on a wall of the elongate structure using the filtered data. The scan can be performed while the scanner is moved by a translating structure on a helical path on the elongate structure.

As a result, one or more technical solutions may provide a technical effect of filtering data from a scan of an elongate structure, such as a pipe or fuel tank in an aircraft wing, to remove a portion of data in the scan that is attributable to the fluid. The filtering increases the ability to detect inconsistencies in elongate structures. Thus, the illustrative examples provide one or more technical solutions that enable inspecting an elongate structure for inconsistencies without having to remove the fluid from a cavity in the elongate structure. As a result, elongate structures can be more easily and quickly inspected.

Thus, the illustrative examples provide a method, an apparatus, and a system that is capable of scanning an elongate structure, such as a pipe, on a helical path. This scanning is performed in a manner that discriminates a portion of backscatter attributable to a liquid or background noise versus the portion of the backscatter attributable to an inconsistency in the elongate structure. As a result, an elongate structure can be scanned quickly and automatically using a scanning system, such as scanning system 104 in FIG. 1. Further, using at least one of a self-contained power supply or a rotatable anode in an x-ray tube can reduce the amount of weight needed for a scanner.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A scanning system comprising:
 a helical track system configured to be placed around an elongate structure, wherein the helical track system comprises helical track sections connected to form a helical track, wherein a prior helical track section in the helical track sections for the helical track is disconnected from a back end of the helical track while the translating structure is on a current helical track section in the helical track sections for the helical track and the prior helical track section is reconnected to a front end of the helical track;
 a translating structure configured to move on the helical track system on a helical path; and
 a scanner connected to the translating structure, wherein the scanner is configured to emit an x-ray beam.

2. The scanning system of claim 1 further comprising:
 a controller, wherein the controller is configured to control the translating structure to move on the helical track system on the helical path and control the scanner to scan the elongate structure while the translating structure moves on the helical track system on the elongate structure.

3. The scanning system of claim 1, wherein the scanner comprises:
 an x-ray source configured to emit the x-ray beam; and
 a sensor system configured to detect backscatter caused by the x-ray beam encountering the elongate structure.

4. The scanning system of claim 3, wherein the sensor system generates images when the backscatter is detected and the images have overlapping fields of view, and wherein a controller performs image stitching to combine the images to provide a segmented image from the images with the overlapping fields of view.

5. The scanning system of claim 1, wherein the helical track system is connected to the elongate structure using at least one of a vacuum system, a biasing system, or a magnetic foot system.

6. The scanning system of claim 1, wherein the translating structure comprises:
 a carriage configured to attach itself to the helical track system; and
 a mobility system configured to move the carriage such that the carriage moves on the helical path on the elongate structure.

7. The scanning system of claim 1, wherein the helical track sections are selected from one of single track sections and dual track sections.

8. The scanning system of claim 1, wherein the helical track section in the helical track sections is comprised of a chain, biased track sections, and a flexible strip.

9. The scanning system of claim 1, wherein the scanner comprises:
 a housing connected to the translating structure;
 a liquid coolant located inside of the housing;
 a power supply located inside of the housing and immersed in the liquid coolant; and
 an x-ray tube located inside of the housing and immersed in the liquid coolant, wherein the x-ray tube is configured such that in operation the x-ray tube generates the x-ray beam that passes through a window in the x-ray tube towards a location on a surface of an object.

10. The scanning system of claim 9, wherein the x-ray tube comprises:
 a vacuum tube with a window;
 a cathode that emits electrons; and
 a rotatable anode that generates x-rays when the electrons collide with the rotatable anode in which the x-rays pass through the window as the x-ray beam, wherein the rotatable anode is configured to direct the x-ray beam to scan an object.

11. The scanning system of claim 1, wherein the elongate structure is selected from one of a pipe, an insulated pipe, an uninsulated pipe, a steel pipe, an oil pipe, a natural gas pipe, a drum, a conduit, a petroleum fluid tank, and an aircraft fuselage section.

12. The scanning system of claim 1, wherein the scanner is configured to emit the x-ray beam as a fan beam.

13. A pipe scanning system comprising:
a helical track system configured to be placed around a pipe, wherein the helical track system comprises helical track sections connected to form a helical track, wherein a prior helical track section is removed from a back end of the helical track sections while the translating structure is on a current helical track section in the helical track sections and the prior helical track section is connected to a front end of the helical track sections;
a translating structure configured to move on the helical track system on a helical path on the pipe;
a scanner connected to the translating structure; and
a controller in communication with the translating structure and the scanner, wherein the controller is configured to control the translating structure to move on the helical track system on the helical path and control the scanner to emit an x-ray beam while the translating structure moves on the helical track system on the pipe; and detect backscatter from the x-ray beam encountering the pipe.

14. The pipe scanning system of claim 13, wherein the scanner comprises:
a housing connected to a carriage;
a liquid coolant located inside of the housing;
a power supply located inside of the housing and immersed in the liquid coolant; and
an x-ray tube located inside of the housing and immersed in the liquid coolant, wherein the x-ray tube is configured such that in operation the x-ray tube generates the x-ray beam that passes through a window in the x-ray tube towards a first location on a surface of an object.

15. The pipe scanning system of claim 13, wherein the helical track sections are selected from one of single track sections and dual track sections.

16. The pipe scanning system of claim 13, wherein the pipe is selected from one of an insulated pipe, an uninsulated pipe, a steel pipe, an oil pipe, a natural gas pipe, a drum, a conduit, a petroleum fluid tank, and an aircraft fuselage section.

17. The pipe scanning system of claim 13, wherein the scanner is configured to emit the x-ray beam as a fan beam.

18. A method for scanning an elongate structure, the method comprising:
moving a scanner in a scanning system on a helical path around the elongate structure, wherein the scanner is moved on the helical path around the elongate structure using a helical track system attached to the elongate structure using a translating structure, wherein the helical track system comprises helical track sections connected to form a helical track;
disconnecting a prior helical track section in the helical track sections for the helical track from a back end of the helical track while the translating structure is on a current helical track section in the helical track sections for the helical track and reconnecting the prior helical track section to a front end of the helical track;
emitting an x-ray beam from the scanner while the scanner moves on the helical path; and
detecting backscatter from the x-ray beam encountering the elongate structure.

19. The method of claim 18 further comprising:
generating images from the backscatter detected from the x-ray beam; and
performing image stitching on the images to combine the images to provide a segmented image when the images have overlapping fields of view.

20. The method of claim 18, wherein the elongate structure is selected from one of a pipe, an insulated pipe, an uninsulated pipe, an oil pipe, a natural gas pipe, a drum, a conduit, a petroleum fluid tank, and an aircraft fuselage section.

21. The method of claim 18, wherein the x-ray beam comprises a fan beam.

* * * * *